March 26, 1929.  L. A. BANTA  1,707,071

REFRIGERANT TANK

Filed Aug. 15, 1927

Inventor
Len A. Banta
By Vernon E. Hodges
his Attorney

Patented Mar. 26, 1929.

1,707,071

UNITED STATES PATENT OFFICE.

LEN A. BANTA, OF CLEARFIELD, PENNSYLVANIA.

REFRIGERANT TANK.

Application filed August 15, 1927. Serial No. 213,137.

My invention relates to an improvement in refrigerant tanks.

The object is to provide a tank, preferably removable, in which the refrigerating medium, such as ice, or cracked ice and salt, may be used.

This tank comprises a receptacle of any suitable shape and dimensions, preferably rectangular, with an insulated bottom which prevents condensation and the consequent dripping of water therefrom, and the contamination of food below contained in the refrigerator.

Another feature of the tank is a receptacle around the bottom to receive condensation or sweat on the sides of the tank.

Figure 1:
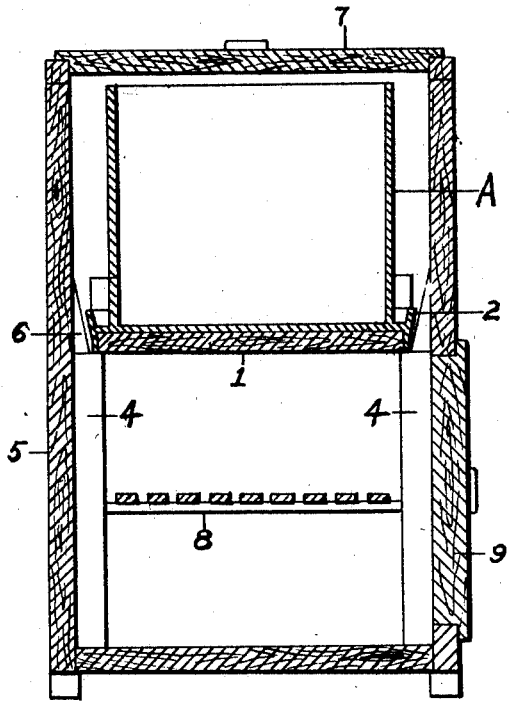
Fig. 1 is a vertical section through the refrigerator or ice-box showing this improved tank.
Figure 3:
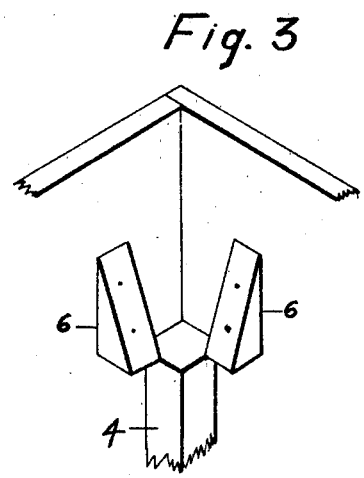
Fig. 3 is a detail of the refrigerator showing a corner support upon which the removable tank is adapted to rest.
Figure 2:
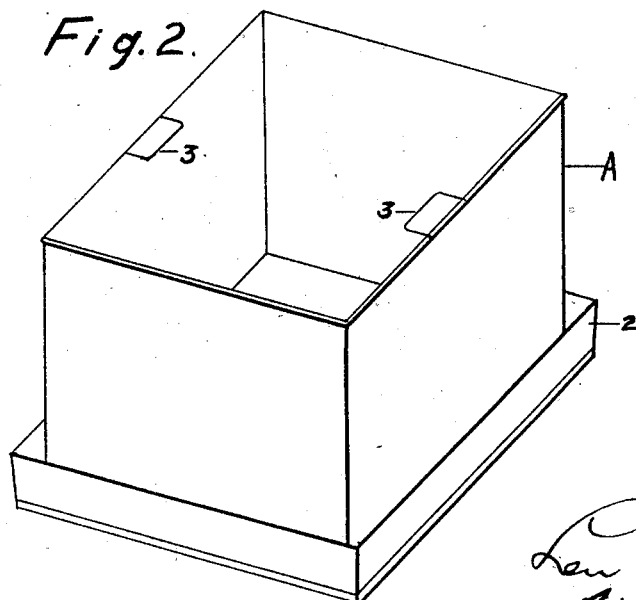
Fig. 2 is a view in perspective of the tank removed from the refrigerator.

A, represents the tank. This is preferably made of sheet-metal, such as galvanized iron, with an insulating bottom 1, preferably of wood or other material to prevent condensation or sweat from accumulating on the bottom surface and dripping upon the contents of the refrigerator therebeneath.

The edges of this bottom preferably extend beyond the body of the tank, and the trough or receptacle 2 is formed all around the protruding edge of the bottom to catch the condensation on the sides of the tank. Handles 3 are provided for convenience in lifting or lowering the tank.

Corner-brackets 4 are provided as a convenient means for the support of the tank when in the refrigerator 5, and slanting guides 6 center the tank when lowered through the top of the refrigerator. A cover 7 is placed over the top, and one or more lugs 8 may be placed in the lower compartment of the refrigerator. The door 9 at the bottom is used for opening and closing the food compartment.

While a chunk of ice is generally placed in the tank, for a low temperature cracked ice and salt may be used.

To empty or clean the tank and the receptacle or trough at the lower edge, it is merely lifted out and water poured off.

By this arrangement, there is no drainage into, or through, the lower part of the refrigerator. It is all confined to the tank and the receptacle or trough around the bottom.

If the melted ice is kept clean by keeping the cover on the top, the water is uncontaminated and may be used for drinking purposes.

I claim:

1. A refrigerant tank consisting of a main receptacle, and an auxiliary receptacle at the bottom extending beyond the sides to catch the condensation, and a bottom of insulating material for the tank and auxiliary receptacle.

2. A refrigerant tank having a bottom of insulating material, said bottom protruding beyond the sides of the tank, and an auxiliary receptacle formed on the protruding portion of the bottom of the tank.

3. The combination with a refrigerator or ice-box having brackets at the corners, and guides extending thereto, of a removable tank adapted to rest on the brackets and be centered by the guides.

4. The combination with a refrigerator or ice box open at the top for the reception of an ice tank, brackets mounted in the refrigerator or ice box spaced a substantial distance below the open top, for receiving and supporting the ice tank, guides associated with the brackets for directing the tank thereto, and a removable tank adapted to rest on the brackets and be centered by the guides.

5. A refrigerant tank comprising a main metallic receptacle having a metallic bottom, and insulating material of substantial thickness secured to and immediately beneath the bottom to prevent condensation from forming on the metallic bottom.

6. A refrigerant tank comprising a main metallic receptacle having a metallic bottom, a trough formed around and at the bases of the external walls of the receptacle to catch the products of condensation therefrom, and insulating material of substantial thickness secured to and immediately beneath the bottom to prevent condensation from forming thereon.

7. A refrigerant tank comprising a main metallic receptacle having a metallic bottom, said bottom being extended beyond the walls of the tank to form a trough therearound to catch the products of condensation from the walls, and insulating material of substantial thickness secured to and immediately beneath the bottom of the receptacle and trough, said trough having a flange extending downward from the outer portion thereof embracing the insulating material and holding it in place.

In testimony wherof I affix my signature.

LEN A. BANTA.